No. 799,591. PATENTED SEPT. 12, 1905.
T. C. DILL.
AUTOMATIC RELEASING DEVICE.
APPLICATION FILED NOV. 14, 1904.
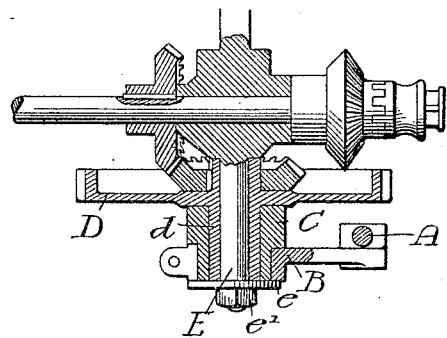
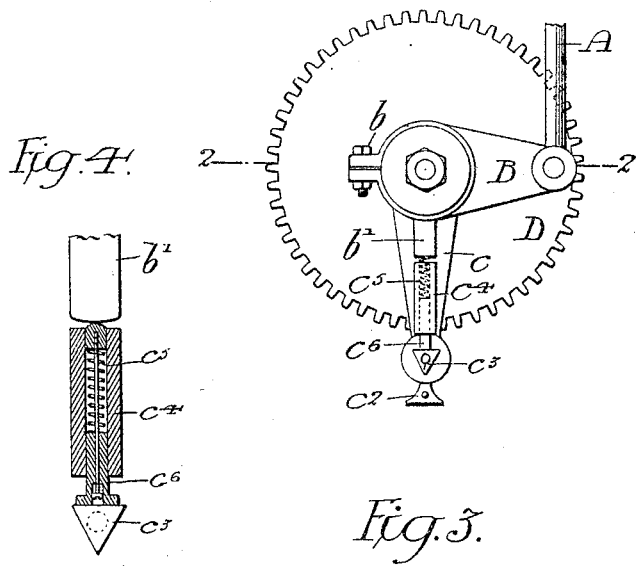
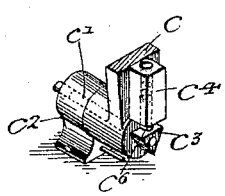
Witnesses:
Titus N. Irons.
Lius H. Buck.
Inventor:
Thomas C. Dill.
by his Attorneys
Howson & Howson

UNITED STATES PATENT OFFICE.

THOMAS C. DILL, OF PHILADELPHIA, PENNSYLVANIA, ASSIGNOR TO T. C. DILL MACHINE COMPANY, INCORPORATED, OF PHILADELPHIA, PENNSYLVANIA, A CORPORATION OF PENNSYLVANIA.

AUTOMATIC RELEASING DEVICE.

No. 799,591. Specification of Letters Patent. Patented Sept. 12, 1905.

Original application filed April 22, 1902, Serial No. 104,097. Divided and this application filed November 14, 1904. Serial No. 232,693.

*To all whom it may concern:*

Be it known that I, THOMAS C. DILL, a citizen of the United States, residing in Philadelphia, Pennsylvania, have invented certain Improvements in Automatic Releasing Devices for Power-Transmitting Mechanism, of which the following is a specification.

My invention consists more particularly of an improved automatic releasing device originally described and illustrated in an application for patent on an improved slotting-machine filed by me on April 22, 1902, Serial No. 104,097, of which this application is a division.

One object of my invention is to provide a device for connecting a driving with a driven member which shall be of such construction that in the event of the load upon the driven member increasing beyond a predetermined amount said device shall automatically act to disconnect said two members.

It is further desired to provide a novel form of coupling interposable in power-transmitting mechanism and so arranged that one part may be moved relatively to another when an abnormal amount of power is transmitted, and thereby operate mechanism which shall release the two parts of the coupling, so as to prevent damage to any of the parts.

I also desire to provide a split coupling with means for releasing a pawl operative upon a toothed structure whenever the two parts of said coupling are moved relatively to each other, as under abnormal conditions of strain.

These objects I attain as hereinafter set forth, reference being had to the accompanying drawings, in which—

Figure 1 is a front elevation of the apparatus comprising one form of my invention. Fig. 2 is a sectional plan view on the line 2 2, Fig. 1. Fig. 3 is a perspective view of a portion of the mechanism illustrated in Fig. 1, and Fig. 4 is an enlarged sectional elevation illustrating the construction of a slightly-modified form of my invention commonly used under working conditions.

In such machines as slotters, planing-mills, and the like it often happens that some portion of the mechanism becomes jammed, with the result that the weakest part of the gearing or other devices connecting said mechanism with the source of power are seriously damaged, owing to the fact that there is no way of automatically disconnecting said source from the stalled member under such condition of abnormal strain. By my invention I have provided a relatively simple and reliable device for preventing such injury.

In the above drawings I have shown my invention as particularly designed for application to the ratchet-feed of a slotting-machine, although it will be understood that it is equally applicable to any other similar device.

A is a rod connected to some source of power, whereby it is reciprocated, and, as shown in the drawings, it is also connected to an arm B, clamped to the cylindrical surface of a sleeve C, which is supported so as to be free to turn upon a second sleeve $d$, attached to and in the present case made integral with a gear-wheel D, which in turn is supported upon a spindle E, the arm B, sleeve C, and said gear-wheel being retained in correct relative positions by means of a washer $e$ and a nut $e'$, threaded to the end of the spindle.

It will be seen that the portion of the arm B encircling the sleeve C is split, there being a bolt $b$, whereby the two portions of said arm may be drawn together, so as to be made to frictionally engage the surface of the sleeve with any desired force.

Projecting from the sleeve C is an arm $c$, in the present instance having its outer extremity formed as a bearing for a spindle, (indicated in dotted lines at $c'$ in Fig. 3,) upon one end of which is fixed a pawl $c^2$. The opposite end of said spindle has fixed to it a piece of metal, in the present instance in the shape of a triangular prism $c^3$, of such dimensions as to be in line with a projecting guide-piece $c^4$, formed upon or as part of the arm $c$. This guide-piece is made tubular for the reception of a spring $c^5$ and a pin or bolt $c^6$, the latter being forced by said spring into engagement with one of the faces of prism-shaped piece $c^3$. Inasmuch as the tubular guide-piece $c^4$ is open at both ends I provide a lug $b'$ on that portion of the arm B which extends around the sleeve C, so proportioning said lug that it is in line with and adjacent to the guide portion $c^4$ on the arm $c$, so as to hold the spring $c^5$ therein. The pawl $c^2$ is so made as to operatively engage the teeth of the gear-wheel D to turn this in either direction.

It will be noted that the prism-piece $c^3$ is so fixed on the spindle $c'$ relatively to the pawl $c^2$ that when the bolt or pin $c^6$ engages one of the faces of said piece said pawl is maintained in a position out of engagement with the gear-wheel D. When, however, said pin engages another of the faces of the piece $c^3$, it tends to maintain the pawl in engagement with the teeth of the gear-wheel, so as to permit of motion of said gear in but one direction, while when in engagement with the third face of the prism-shaped piece it so acts upon the teeth of the gear as to permit the revolution of the same only in the direction opposite to that above indicated.

In the present instance I have shown in addition to the mechanism comprising my invention certain gear-wheels, a shaft, and a coupling forming part of the operating mechanism of the slotting-machine described and claimed in my above-mentioned application for patent; but inasmuch as these parts have no material bearing upon my present invention they will not be described and shown in detail.

Under operating conditions the split bearing of the arm B is clamped, by means of the bolt $b$, upon the sleeve C, so that when more than a predetermined amount of power is transmitted through the arms $c$ and B said bearing portion will slip upon said sleeve. It will be understood that under normal conditions the reciprocation of the rod A causes the lever formed by the two arms B and $c$ to oscillate upon the sleeve portion $d$ of the gear-wheel D and that with the pawl $c^2$ turned on its spindle $c'$ so that it engages the teeth of said gear-wheel this latter will be intermittently turned, said pawl being maintained in engagement with the teeth by reason of the pressure of the pin or bolt $c^6$ against one of the faces of the prism-shaped piece $c^3$. If, now, the mechanism connected to and driven by the gear-wheel D should jam or become stalled, the bearing portion of the arm B will slip upon the sleeve C, and thereby cause the lug $b'$, which forms a part of said arm, to move out of line with the guide portion $c^4$ of the arm $c$. By this means the spring $c^5$ is released, and as the bolt $c^6$ no longer presses upon the prism-shaped piece $c^3$ the pawl $c^2$ is immediately forced out of engagement with the teeth of the gear D, thereby completely separating or disconnecting the driven mechanism from the source of power and preventing injury to any of the various parts of the machine. After the cause of abnormal strain has been removed the spring $c^5$ may be replaced within the guide, and after the bolt $b$ has been loosened the arms B and $c$ may be returned to their normal relative positions, after which said bolt is again tightened and the device is ready for operation.

It will be understood that while I have shown and described a pawl-and-ratchet construction as employed to transmit power from the arm $c$ to the shaft E, any other form of clutch may be substituted for this without departing from my invention, it being also noted that other equivalent forms of toothed structure may be substituted for the wheel D.

As used in the claims, it is desired that the word "clutch" shall include not only the pawl-and-ratchet mechanism shown, but also equivalent devices.

I claim as my invention—

1. A device for connecting driving with driven mechanism, the same including a clutch, a lever having its arms connected so as to be free to move relatively to each other under abnormal strains, one of the members of the clutch being carried on the lever, and means for normally maintaining said clutch member in operative position, the same being constructed to release the clutch member when said lever-arms move relatively to each other, substantially as described.

2. A device for connecting driving with driven mechanism, the same including a toothed structure, a lever having its arms connected so as to be free to move relatively to each other under abnormal strains, a pawl operative on said structure and carried by the lever, and means for retaining the pawl in a definite position, said means being constructed to release said pawl when said arms move relatively to each other, substantially as described.

3. A device for connecting driving with driven mechanism, the same including a toothed structure, a lever having frictionally-connected arms, of which one is attached to the driving mechanism and the other has a pawl pivoted to it, said pawl being operative upon said toothed structure, and a spring-actuated bolt carried on one of the lever-arms and operative on the pawl for retaining it in a definite position, said bolt releasing said pawl when the lever-arms move relatively to each other, substantially as described.

4. A device for connecting driving with driven mechanism, the same including a toothed structure, a lever having frictionally-connected arms, of which one is connected to the driving mechanism and the other carries a pawl, a spring-actuated bolt carried on one of the lever-arms and operative on the pawl for retaining it in a definite position, a portion of the other arm being placed to normally retain the spring of the bolt in its operative position and being constructed to release said spring when the lever-arms move relatively to each other, substantially as described.

5. The combination of a lever having a split sleeve connected to one of its arms and a bearing portion on its other arm constructed to receive the sleeve of the first arm, with means for clamping said sleeve to the bearing portion, a device to be operated, means carried on one of the arms for moving said device when said arm is moved in one direction, means for connecting the second arm to a source of power, with a device for automatically disconnecting the lever from the device to be operated when one of its arms moves relatively to the other, substantially as described.

6. The combination of a lever having two arms frictionally held together, a pawl carried by one arm, with spring-actuated means for retaining it in a definite position, a projection from the other arm normally maintaining said spring-actuated means in operative position, means for connecting the latter arm to a source of power and mechanism operated by the pawl, substantially as described.

7. The combination of a lever having two arms free to move relatively to each other under abnormal strains, a clutch, and mechanism connecting the clutch and one of the lever-arms including means whereby movement of one arm of the lever causes the two members of the clutch to be disconnected, substantially as described.

In testimony whereof I have signed my name to this specification in the presence of two subscribing witnesses.

THOMAS C. DILL.

Witnesses;
WILLIAM E. BRADLEY,
WALTER CHISM.